United States Patent Office 3,000,924
Patented Sept. 19, 1961

3,000,924
TETRAKIS(DIHYDROXYBOROXYALKYL)
ALKYLENEDIAMINES
Bernard Rudner and Mead S. Moores, Pittsburgh, Pa., assignors to Koppers Company, Inc., a corporation of Delaware
No Drawing. Filed June 20, 1960, Ser. No. 37,072
6 Claims. (Cl. 260—462)

This invention relates new monoesters of boric acid which contain more than one boron atom and to a method of making these new esters. In one specific aspect, it relates to the N,N,N',N'-tetrakis (2-dihydroxyboroxyalkyl)alkylenediamines and their preparation of the hydrolysis of the bifunctional esters, comprising two unfused boron-containing heterocyclic rings connected by an alkylene bridge, known as alkylene-bis-boracyclooctanes.

In our copending application Serial No. 860,071, filed December 17, 1959, and in our copending application Serial No. 37,070, filed even date herewith, which is a continuation-in-part of said application, we described and claimed a new class of alkylene-bis-boracyclooctanes having the general formula:

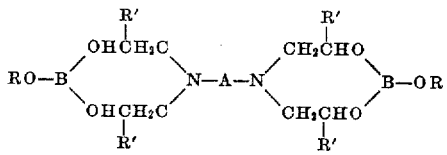

In the above formula, R is a member selected from the group consisting of alkyl radicals having from 1–20 atoms, epoxy lower alkyl, furfuryl, tetrahydrofurfuryl and hydroxy lower alkyl, R' is hydrogen or lower alkyl, and A is a divalent lower alkylene chain having from 2–6 carbon atoms which is attached to each nitrogen atom through a different carbon atom. These compounds have remarkable resistance to alcoholysis and, because of the two functional groups that they contain, are directly useful as major components in the formation of novel stable condensation polymers described and claimed in our copending application Serial No. 860,064, filed December 17, 1959. Quite surprisingly, we have found that a specific class of the above compounds, i.e. those in which R' is lower alkyl, can be hydrolysed to give new and useful monoesters of boric acid containing 4 boron atoms. The structure of the new monoesters is particularly surprising, since Lappert, in his comprehensive article on organic compounds of boron, Chem. Reviews, 56, 959–1064 (1956) reports that there are no known monoesters of boron containing more than one boron atom.

Our new compounds are remarkably effective curing agents for paint latices and epoxies. For example, the compounds can be added in small amounts, e.g. 1–2% by weight, to a styrene-methacrylate latex to improve the solvent resistance and flame resistance of the films formed therefrom. Latices or emulsions containing the novel compounds are storage stable and their films cure quickly to a smooth hard finish. In addition to serving as curing agents and flame resists, the presence of our new compounds in the paint latex in the above indicated amounts serves to effectively increase the fungicidal power of the latex and the coating obtained therefrom.

Our novel compounds are also effective as broad spectrum biocides. Thus, a 1% dispersion of ethylenebis[imino-bis(dihydroxyboroxypropane)] in a water-kerosene emulsion gave improved maggot control when sprayed on garbage cans. As shown in Example IV, the same product in aqueous solution is an effective fungicide.

It is, therefore, an object of the present invention to provide a new class of boric acid monoesters, the tetrakis(2-dihydroxyboroxyalkyl) alkylenediamines, which are useful, inter alia, as curing agents for latices and epoxies, and as active ingredients in biocides and fungicides. It is a further object to provide a novel method for making the new esters.

In accordance with the invention, we have discovered compounds of the general formula:

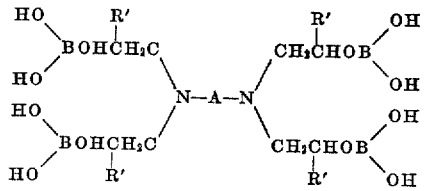

In the above formula, R' is lower alkyl and A is a divalent normal lower alkylene chain having from 2–6 carbon atoms which is attached to each nitrogen atom through a different carbon atom. Thus, the simplest representative of our novel compounds is chemically N,N,N',N' - tetrakis (2 - dihydroxyboroxypropyl)ethylenediamine; all other members are homologs of this compound.

The basic starting materials for use in the invention are the alkylene-bis-boracyclooctanes of the formula:

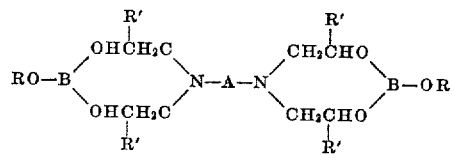

wherein R is a member selected from the group consisting of alkyl radicals having from 1–20 carbon atoms, epoxy lower alkyl, furfuryl, tetrahydrofurfuryl and hydroxy lower alkyl, R' is lower alkyl and A is a divalent lower alkylene chain having 2–6 carbon atoms which is attached to each nitrogen atom through a different carbon atom. As we have noted, these parent compounds are made according to the methods described in our copending application, Serial No. 860,071 filed December 17, 1959, and continuation-in-part application Serial No. 37,070; the preferred method being the transesterification of an N,N,N',N'-tetrakis-(2-hydroxyalkyl) alkylenediamine with an organic borate.

In accordance with the invention, the novel tetrakis(dihydroxyboroxyalkyl)alkylenediamines are made by admixing the parent alkylene-bis-boracyclooctanes with at least a stoichiometric quantity of water and recovering the product tetrakis(dihydroxyboroxy) compound from the reaction mixture. The reaction proceeds generally according to Equation I shown hereunder:

(I)

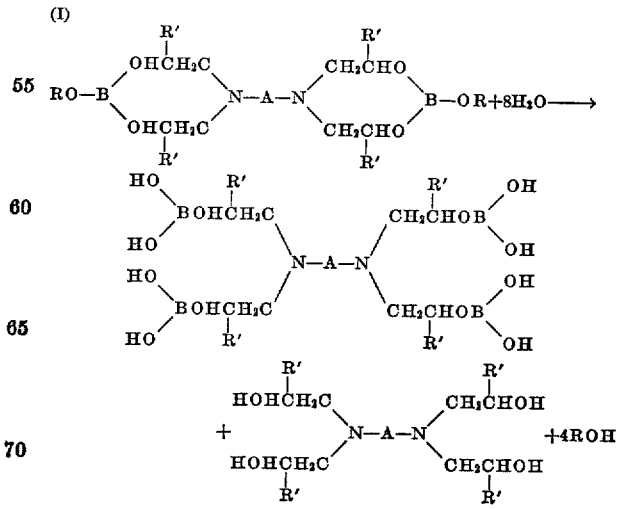

In the above equation, the values for A, R, and R' are those given aforesaid.

It will be observed from Equation I that the process of the invention involves an unusual hydrolytic reaction in that hydrolysis and disproportionation occur simultaneously to give as coproducts the compounds of the invention, the tetrakis(dihydroxyboroxyalkyl)alkylenediamines containing 4 boron atoms, and a tetrol containing no boron atoms which is useful as a starting material in preparing the compounds of our copending application, Serial No. 860,071. The third product of the reaction is an alcohol, the organic portion of which corresponds to the R group of the parent alkylene-bis-boracyclooctane.

As we have noted, the novel hydrolysis and disproportionation proceeds when the alkylene-bisboracyclooctane is mixed with at least a stoichiometric quantity of water. Thus, using the simplest alkylene-bis-boracyclooctane as a reactant, the stoichiometric mixture corresponds to an aqueous solution containing about 85% by weight boracyclooctane. Since higher temperatures are sometimes required to promote solubility of the reactant at such high concentrations, it is usually preferable to provide a substantial excess of water as a solvent. While there is no upper limit on the amount of water that can be present, we prefer to form a reaction medium comprising about 5–50% by weight boracyclooctane and 50–95% water. Since the product tetrakis(dihydroxyboroxyalkyl)alkylenediamine is quite water soluble, although less so than the coproduct aminotetrol, it is preferable to use the more concentrated solutions to promote crystallization of the desired product. There is no exact limit with respect to concentration, since after hydrolysis is complete water can be removed by evaporation until the principal product separates from the reaction mixture. No advantage is seen in using dilute solutions; i.e. those containing less than about 5% by weight alkylene-bis-boracyclooctane reactant.

Reaction proceeds rapidly at atmospheric pressure and room temperature, although reaction will occur at temperatures as low as 0° C. or as high as 150° C. No advantage is seen using the higher temperatures unless such temperatures are required to promote the solubility of the alkylene-bis-boracyclooctane. In such cases, it is often helpful to provide a co-solvent, conveniently a water soluble ether such as diglyme, dioxane, diethyl ether and the like. If the alcohol formed as a coproduct is non-volatile, a co-solvent is also helpful.

If the coproduct alcohol is volatile, it is sometimes advantageous to strip it off substantially as it is formed under reduced pressure, of e.g. 10 mm. of Hg up to atmospheric pressure. In such cases the use of a non-volatile water soluble co-solvent such as ethylene glycol methyl ether, diethylene glycol methyl ether, dimethylformamide and the like is helpful.

If the alcohol is non-volatile and water insoluble, it can be removed by extracting the aqueous solution of the products with, for example, chloroform before precipitating out the product tetrakis(dihydroxyboroxyalkyl)alkylenediamine. The extraction operation will also remove a small quantity of the aminotetrol. The major portion of the aminotetrol is easily separated from the principal product, since the tetrol is much more soluble in water.

Our invention is further illustrated by the following examples.

Example I

A solution of 225 g. of 1,2-bis-(3,7-dimethyl-5-methoxy-1-aza-5-bora-4,6-dioxa-cyclooctyl-1-)ethane in 300 ml. of water began to precipitate crystalline N,N,N',N'-tetrakis(2-dihydroxyboroxypropyl)ethylenediamine within one hour of its preparation at room temperature. The colorless crystals were collected on a filter, washed with ice water, and dried. This first crop weighed 77.8 g. and melted 150–7° C. Additional crops were collected by dilution of the mother liquor with acetone to bring the total yield of product to 124 g. (88% of theory). Recrystallization from boiling water gave large crystals melting 170–4° C., with foaming and evolution of water. Analysis: Found: C, 36.4; H, 7.8; B, 9.36; N, 5.97; $H_2O$, 31.0%. Calculated for $C_{14}H_{36}B_4N_2O_{12}$: C, 35.95; H, 7.76; B, 9.25; N, 5.99; $H_2O$, 30.8%. A 10.0 g. sample of the product dissolved in 39.0 ml. of water at 37° C. It was also soluble in methanol and in pyridine, slightly soluble in chloroform and in dimethyl formamide, swelled by benzene and by xylene, and insoluble in acetone, methylethyl ketone, isopropanol, tert-butanol, ethyl acetate, and in ether. The infrared spectrum of the new monoester exhibited strong absorption bands at 3.02, 3.13, 8.23, 3.40, 8.63, 8.82, 8.99, 11.4, and 12.35µ. The new ester forms a deep blue water soluble copper salt.

Example II

A 10.0 g. portion of 1,2-bis(3,7-dimethyl-5-butoxy-1-aza-5-bora-4,6-dioxacyclooctyl-1-)ethane was dissolved in a minimum amount of water (3.0 g.) in a boiling water bath. The odor of n-butanol was noticeable. The clear solution was allowed to cool to room temperature to form a crystalline slurry. The mixture was triturated with an equal volume of acetone and stored at 4° C. overnight. The aqueous acetone slurry was then filtered to give 3.6 g. (70% of theory) of white, microcrystalline powder, M.P. 168–70° C. with foaming and evolution of water. There was no depression of melting point on admixture with previously prepared N,N,N',N'-tetrakis(2-dihydroxyboroxypropyl)-ethylenediamine.

Example III

An 8.5 g. portion of 1,2-bis(3,7-dimethyl-5-octadecoxy-1-aza-5-bora-4,6-dioxacyclooctyl-1-)-ethane was dissolved in hot tetrahydrofuran and 0.72 g. of water was added to the clear solution. After one hour of reflux on a steam cone the mixture had produced a crystalline precipitate of 1.55 g. (66% of theory) of a product identical with that of Example I M.P. 170–4° C. (after crystallization from water), with foaming and evolution of water. There was no depression of the melting point on admixture with the product of Example I.

Example IV

A 9.0 cm. diameter plate was cast from nutrient agar containing 0.1% N,N,N',N'-tetrakis(2-dihydroxyboroxypropyl)ethylenediamine. A similar plate was cast from untreated agar. After sterilization both plates were inoculated with a virile culture of Poria incrassata (B. and C.) Burt. The plates were then incubated at 80° F. and 70% relative humidity. After two weeks the untreated control plate was completely covered by the wood destroying fungus, but the treated plate contained a colony only 3.5 cm. in diameter after two weeks and 4.5 cm. in diameter after four weeks.

Example V

Latices were prepared in which the solids content comprised a fixed 40% of 2-ethylhexyl methacrylate; 12, 6 or 5% glycidyl methacrylate; and the rest styrene. To equal portions of these were added, in 1 and 2% by weight (of the solids content) concentrations, except for the control, diverse recognized epoxy cures (including ethylenediamine and a commercially available methylolmelamine condensate: and N,N,N',N'-tetrakis(2-dihydroxyboroxypropyl)ethylenediamine. Only the latices containing our novel product remained as stable and floc-free as the controls (which contained no additive). Films of known thickness were cast from each latex onto glass; these were air-dried at 150° C. for 25–30 minutes. The films containing our novel product were color-free and devoid of specks. Sward hardness was determined on each of the films; those containing the new boric acid monoester showed no loss of strength, compared to the control. Films containing our compound showed marked resistance to the swelling action of organic solvents; this superiority over control films was most evident in those films made with the smaller quantities of expensive glycidyl methacrylate. In addition, the films remained odor-free, while those made from amines or amine-formaldehyde condensates had or developed unpleasant odors. Films containing 2% (solids content) of our tetra-borate are appreciably more flame resistant than those of the control or amine-cure.

We claim:

1. A compound of the formula:

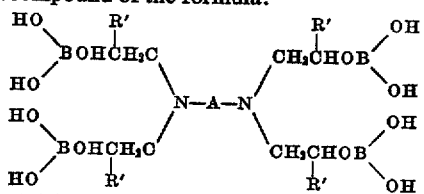

wherein R' is lower alkyl and A is a divalent normal lower alkylene chain having 2-6 carbon atoms.

2. N,N,N',N'-tetrakis-[-2-(dihydroxyboroxy-)proply-]ethylenediamine.

3. A method of making a tetrakis(dihydroxyboroxyalkyl)alkylenediamine of the formula:

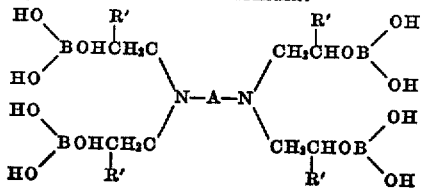

wherein R' is lower alkyl and A is a divalent normal lower alkylene chain having from 2-6 carbon atoms comprising reacting an alkylene-bis-boracyclooctane of the formula:

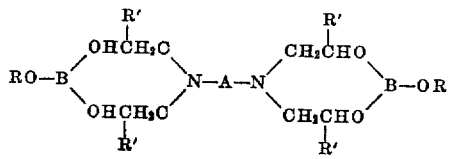

wherein R is a member selected from the group consisting of alkyl radicals having from 1-20 carbon atoms, epoxy lower alkyl, tetrahydrofurfuryl, furfuryl and hydroxy lower alkyl and R' and A are as defined aforesaid, with at least a stoichiometric quantity of water and recovering said tetrakis(dihydroxyboroxyalkyl)alkylenediamine from the reaction mixture.

4. Method according to claim 3 wherein the reaction temperature is maintained between 0° and 150° C.

5. Method according to claim 3 wherein the reaction medium comprises 5–50% by weight alkylene-bis-boracyclooctane and 50–85% water.

6. Method according to claim 3 wherein R is an alkyl radical having from 1–20 carbon atoms.

No references cited.

UNITED STATES PATENT OFFICE

CERTIFICATE OF CORRECTION

Patent No. 3,000,924            September 19, 1961 .

Bernard Rudner et al.

It is hereby certified that error appears in the above numbered patent requiring correction and that the said Letters Patent should read as corrected below.

Column 6, line 27, for "50-85%" read -- 50-95% --.

Signed and sealed this 1st day of May 1962.

(SEAL)
Attest:

ERNEST W. SWIDER
Attesting Officer

DAVID L. LADD
Commissioner of Patents